United States Patent
Martin et al.

[11] 3,976,973
[45] Aug. 24, 1976

[54] HORIZONTAL SCAN VERTICAL SIMULATION CHARACTER READING

[75] Inventors: Charles E. Martin, Roswell, N. Mex.; Stanley C. Requa, deceased, late of Dallas, Tex.; by William Muir, Northridge, Calif.

[73] Assignee: Recognition Equipment Incorporated, Irving, Tex.

[22] Filed: Apr. 22, 1974
(Under Rule 47)

[21] Appl. No.: 462,743

[52] U.S. Cl. .................. 340/146.3 F; 235/61.11 E; 340/146.3 MA
[51] Int. Cl.² ...................... G06K 9/00; G06K 7/10
[58] Field of Search .......................... 235/61.11 E; 340/146.3 F, 146.3 MA

[56] References Cited
UNITED STATES PATENTS

| | | | |
|---|---|---|---|
| 3,105,956 | 10/1963 | Greanias et al. | 340/146.3 F |
| 3,184,732 | 5/1965 | Haynes | 340/146.3 F |
| 3,277,286 | 10/1966 | Preston et al. | 340/146.3 F |
| 3,613,080 | 10/1971 | Angeloni, Sr. et al. | 340/146.3 MA |
| 3,634,823 | 1/1972 | Dietrich et al. | 340/146.3 MA |

*Primary Examiner*—Daryl W. Cook
*Attorney, Agent, or Firm*—Richards, Harris and Medlock

[57] ABSTRACT

Variations in scan rate and in position of a character within a field resulting from positional inaccuracies caused by use of a hand-held scanning device and/or loosely constrained document printing mechanisms and techniques are accommodated by sweeping a two-dimensional sensing array of about one character width and several character heights horizontally along a line across the field and applying a matrix of output signals resulting from each character to a recognition unit. Each set of signals is shifted vertically through the recognition unit at a rate such that all cells of the array are scanned in an interval required for movement of the field on the array of less than one resolution cell. Character recognition is attempted for each one-cell-height increment that the set is vertically shifted. A recognition output signal is produced when a character in the shifted set is brought into registration with a set of inputs leading to the recognition unit.

11 Claims, 18 Drawing Figures

SEGMENTS

VOIDS

ONE

FOUR

SEG H

HORIZONTAL SCAN VERTICAL SIMULATION CHARACTER READING

FIELD OF THE INVENTION

This invention relates to a system and method for optical character recognition of merchandise labels at a point of sale terminal. In a more specific aspect, the invention relates to a scanning system for manually sweeping a scan head over alphanumeric data fields and automatic input thereof to a dispensing inventory system.

DESCRIPTION OF THE PRIOR ART

Systems for automatically reading alphanumeric data have been developed for various uses. However, in general the systems are large and complex. In large measure they are of the type through which documents of various sizes are passed, with the documents moving through a reading zone. The scanned field is then converted into either analog or digital form, and processed to identify the characters occupying the scanned field.

In such systems, registration between the scanning system and the document can be controlled. Control of both the document and the scan head minimizes reading problems.

In merchandising operations, a goal is the realization of a system which comprises a hand-held wand to scan data fields on merchandise or tags, and which automatically feeds into acounting and inventory systems the data fully describing sales or dispensing transactions. Because of the variations in the relative movement between the scan unit and the data field as well as misregistration, skew and the like, the use of a hand-held and hand-operated wand multiplies the problems involved in recognition of the data.

A method is provided for overcoming variations in scan rate and in position of a character resulting from positional inaccuracies encountered in the use of hand-held scanning devices and/or loosely constrained document printing mechanisms and techniques, where the character is within a field of view of several character heights. A two-dimensional sensing array of several character heights is moved horizontally along a line crossing a character field. The output of the array is applied to a black/white thresholding circuit. The thresholded image is shifted vertically through a recognition unit to simulate vertical movement of the array in one-cell-height increments at a rate such that all cells of the array are scanned in an interval required for movement of the field on the array of less than one resolution cell. Character recognition is attempted with each one-cell-height vertical increment for producing a recognition signal at the output of the recognition unit.

In a more specific aspect, a hand operated optical data acquisition and processing system includes a two-dimensional photosensitive array of width of at least five cells and of height substantially in excess of seven cells. Means are provided to focus onto the array a field past which the array moves horizontally with widest character in the field spanning at least five cells. A serial in-parallel out shift register of width corresponding to the width of the array and about 1½ times the height of a character is connected to the array for storage of binary signals representing an image. Control means then shifts the signals through the register in direction to simulate vertical movement of the array relative to the field at a rate which is high compared to the rate of horizontal movement, whereby the signals are interpreted as they move through the register.

DESCRIPTION OF THE DRAWINGS

For a more complete understanding of the present invention and for further objects and advantages thereof, reference may now be had to the following description taken in conjunction with the accompanying drawings in which.

DESCRIPTION OF THE PREFERRED EMBODIMENT

FIG. 1

Figure 1:
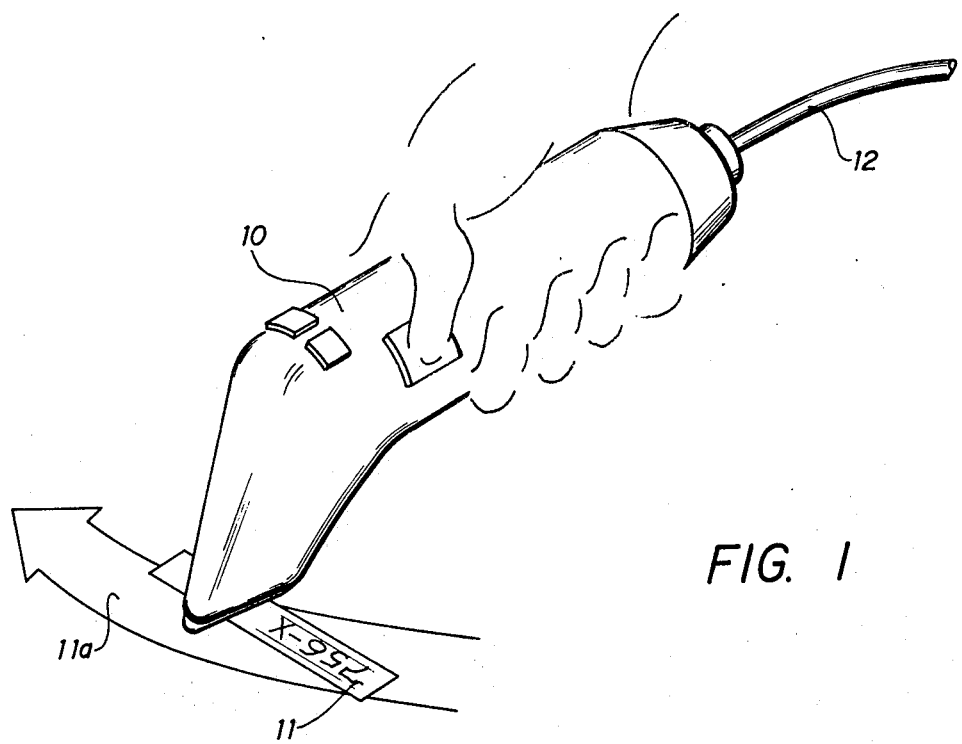
FIG. 1 is a perspective view of the hand-held wand in operation.

In FIG. 1, a hand-held wand 10 is provided for movement across a data field such as a tag 11 as along path 11a. Wand 10 has an aperture through which light passes to illuminate the tag 11 in order that the tag 11 may be viewed by an optical system. The wand 10 is connected by way of cable 12 to a processing unit which serves to identify alphanumeric data on tag 11.

It will be recognized that the sweep of wand 10 across the tag 11 may not be at a uniform velocity, and may follow a non-linear path 11a which does not correspond with the lines of data printed on tag 11. Further, the aperture in wand 10 may be skewed during all or part of its course across tag 11.

The present invention is directed to provision of reliable automatic reading of printed data such as that on tag 11, even though all of the problems introduced by variable velocity, skew, depth of field, and cross track sweep or misregistration by the wand are present.

Figure 2:
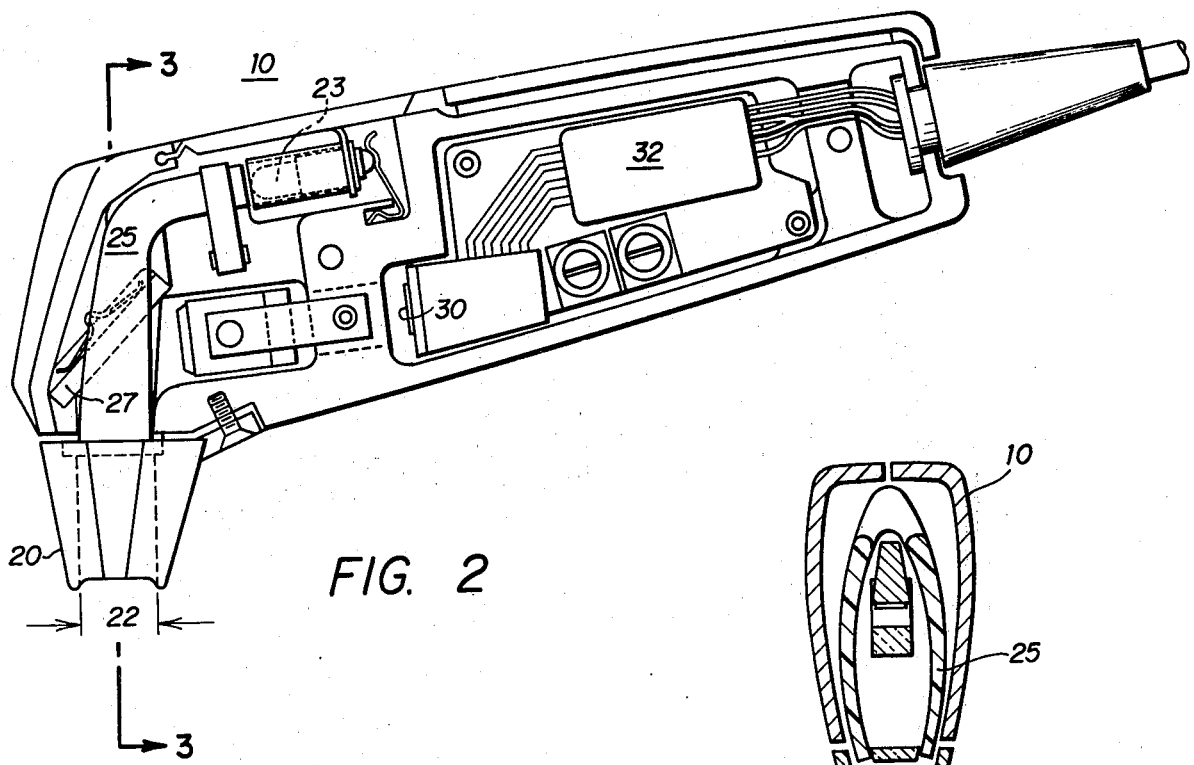
FIG. 2 is a side view of the wand of FIG. 1 with the side cover removed.
Figure 3:
FIG. 3 is a sectional view taken along line 3—3 of FIG. 2.

FIGS. 2 and 3

One embodiment of the wand is illustrated in FIGS. 2 and 3. In this embodiment the wand tip 20 is provided with an aperture 21, FIG. 3. Aperture 21 normally would extend the width of a numeral or character to be read. The height 22 of the aperture would span several times the normal height of the characters to be read. A lamp 23 is mounted in the upper portion of wand 10 with suitable optical means such as fiber optic member 25 directing light through the aperture onto the field to be viewed. The image in aperture 21 is then reflected by a mirror 27 onto a two-dimensional, monolithic self-scanned large size integrated circuit photodiode array 30. Array 30 is then connected by way of circuitry 32 and cable 12 to processing units.

Figure 4:
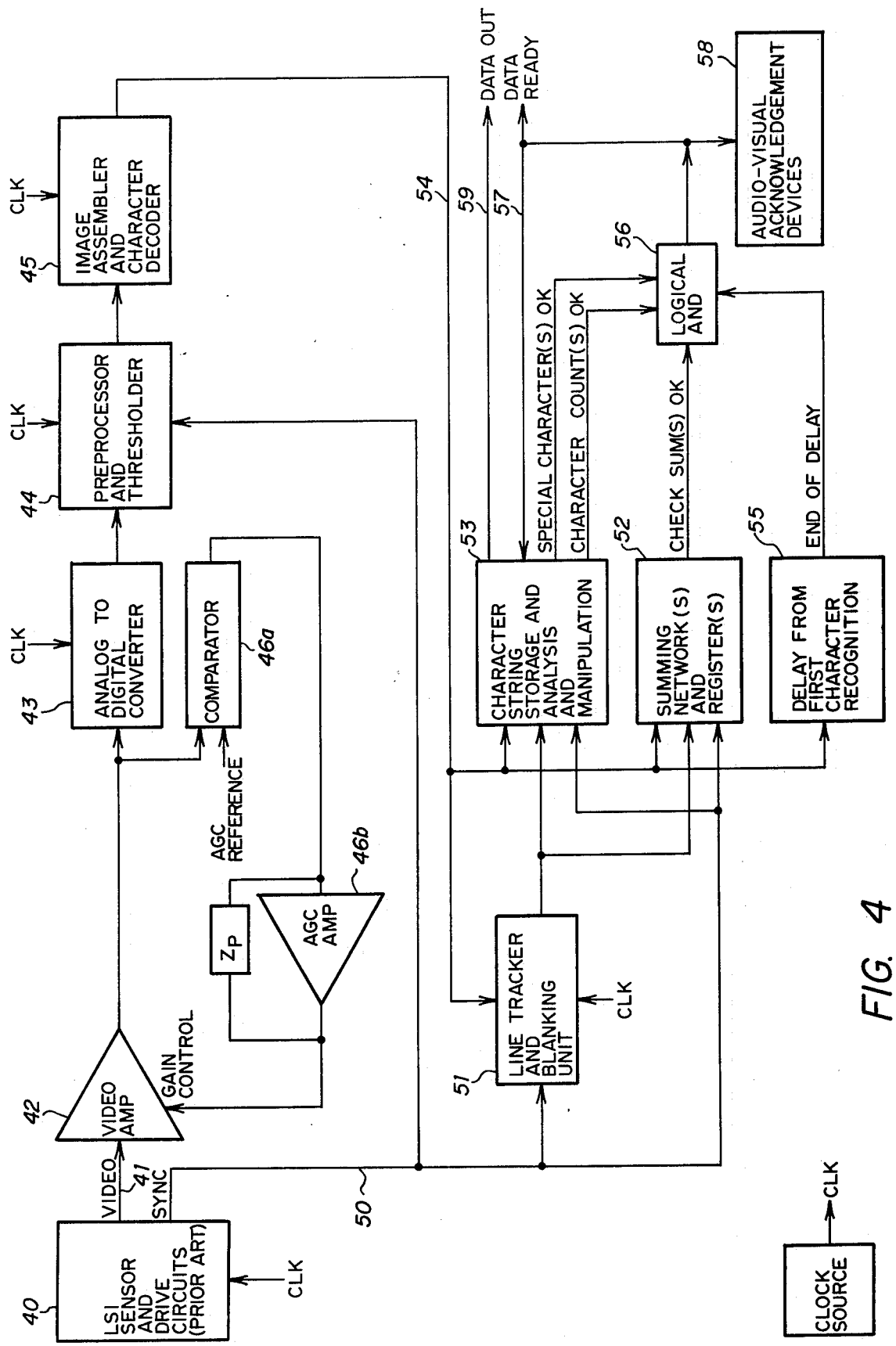
FIG. 4 is a block diagram of the wand system.
Figure 5:
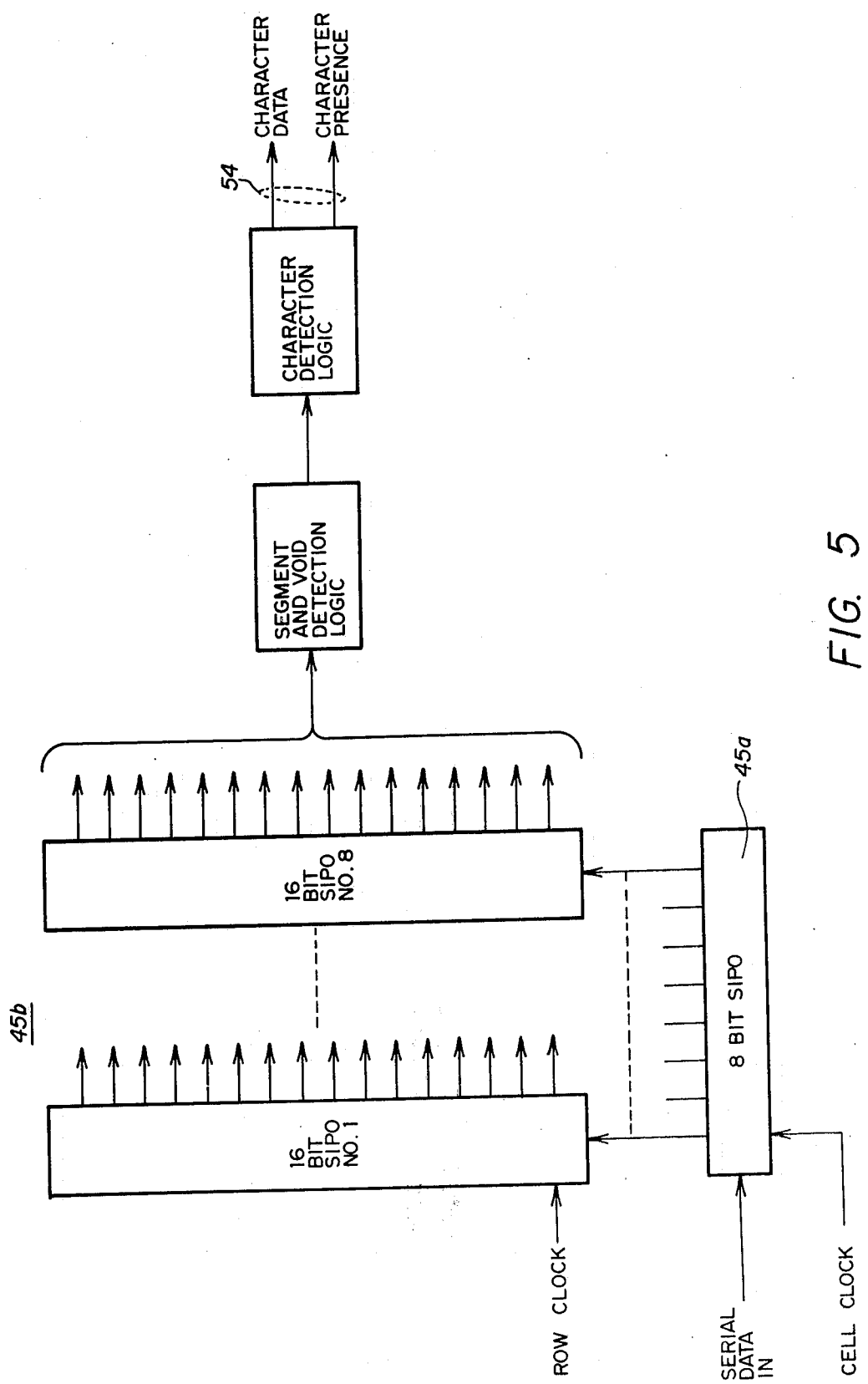
FIG. 5 is a block diagram showing the image assembler and character decoder in an expanded form.

FIGS. 4 and 5

FIG. 4 illustrates in block form one embodiment of the present invention. In this system, unit 40 represents the self-scanned array 30 of FIG. 3 and the drive circuit therefor. A line 41 extends from unit 40 by way of a video amplifier 42 to an analog-to-digital converter 43.

Video amplification includes a gain control circuit which performs a dynamic image data correlation function. The amplified video signal and a constant AGC reference are compared in a comparator 46a. The output of said comparator drives an AGC amplifier 46b with a time constant of the order of several frame scanning periods. This time constant results in the amplified video signal being normalized to a nearly constant average value for a wide range of document background reflectivities. Since the total area covered by character strokes is much less than the area of the field of view, the presence or absence of character strokes within the field of view of the sensor has only a minor effect on the gain setting. The resultant narrow range of the average amplified video signal allows a reduced range capacity in the analog-to-digital converter, preprocessing, and thresholding circuits. After amplification the analog video signal is converted to digital form by the analog-to-digital converter 43. Digital video information is sent to the preprocessor and thresholder circuits 44. The functions of these circuits are the enhancement and further correlation of the data, and the thresholding of the data to a black or white binary quantity. The thresholded data enters the Image Assembler 45 in the form of serial data corresponding to eight black or white points (cells) along a line passing horizontally through the image. Eight bits are shifted into a serial-to-parallel converter (SIPO) 45a, FIG. 5. Then the data on each said parallel output is clocked into the serial input of one of eight 16-bit serial-to-parallel converters 45b. Serial data corresponding to an adjacent line through the image is then clocked into the eight bit SIPO 45a, and the above process continually repeated. The contents of the eight 16-bit SIPO's 45b may be visualized as a 16 cell high, eight cell wide, enhanced and thresholded portion of the image within the field of view of the sensor. Decoding circuitry attached to the parallel outputs of the SIPO array detects character stroke segments, and void or all-white regions. The correct combination of stroke segments and voids constitutes the decoding of a character. The scanning and SIPO clocking technique result in the apparent vertical movement of the entire image, or frame, through the SIPO array image assembler in one cell width increments. Apparent horizontal motion of the image through the image assembler is due to motion of the hand-held sensing unit across the subject. In a preferred embodiment with a frame rate of 3,500 frames per second and a sweep velocity of 45 centimeters per second, the scanner sweeps $45 \div 3,500 = 0.13$ millimeters per frame, or about half the thickness of a character stroke. With a sensor length of 64 cells, the image is clocked vertically through the image assembler at a rate of $64 \times 3,500 = 224$ kilohertz, which allows over 4 microseconds for the settling of the character decode logic. This speed allows use of metal oxide semiconductor LSI for the character decode logic and most of the image assembly.

Character skew is allowed by use of logical ORs in the character decode logic. Since an entire frame is clocked vertically through the image assembler, vertical character registration is not important to the character decoder so long as the entire character is within the optical field of view.

Line 50, FIG. 4, leading from unit 40 provides a sync pulse to unit 44. Line 50 is also connected to a line tracker and blanking circuit 51, to a summing network and register 52 and to a character string storage unit 53. The output of unit 45 is connected by way of line 54 to units 51, 52 and 53, and to a delay unit 55. Units 52, 53 and 55 are connected to a logic circuit 56. Output line 57 leading from unit 56 is connected to a confirmation unit 58 which will provide a signal acknowledging a successful reading of a given string of characters. Line 59 of unit 53 may be connected to a system such as inventory control, point of sale terminals, and similar systems to utilize the results of a scanning operation.

To allow line following, the vertical positioning of a character is allowed to differ by a small amount $\alpha V$ from the previous character in a given line. Thus, a line may begin at one extremity of the field of view and be tracked gradually across the field of view to the opposite extremity. This capability is required for human swept scanning in a loosely constrained environment such as the point of sale. The line tracking circuit 51 is a counter and logic which provides a binary number $V_c$ corresponding to the vertical position of the character in the field of view. Each of a plurality of character string storage registers 53 is identified by binary number $V_n$ corresponding to the vertical positioning of the last character detected for that character string. Upon detection of a character, said binary number $V_c$ is compared with the binary numbers $V_n$ identifying the existing character strings. Where $\Delta V = |V_n - V_c|$, and $\alpha V$ is less than approximately one-half of the height of a character, the new character is added to the character string.

Because each character may be recognized in more than one snapshot, a blanking circuit 51 is required to avoid multiple loading of a given character into a character string register 53.

For the application of reading more than one line at a time, each character string register must have its own blanking circuit. The preferred embodiment is a down-counter which is reset to a constant K whenever a character is recognized. The down-counter count input is the end-of-frame sync. When the down-counter counts down to zero, K frames have been searched with no character being recognized. This constitutes a decision that the sweeping motion has moved the latest character out of the field of character recognition. The loading of a character into a character string register is enabled only when the down-counter identified with said register is in a zero count state. Character strings are analyzed for special character content in unit 53. The location within the string of a special character reveals the direction of manual sweep of the wand. The special character reveals the significance of the character string, and reveals how many characters are needed to satisfy the fixed field length requirement. The length of the character string is examined for compliance with the field length requirement. For custom LSI implementation of this function, full parallel logic may perform the preceding storage and analyses. For low volume production, a general purpose microprocessor is sufficient. Checksum acceptability for a character string is calculated by arithmetic networks and registers in a conventional manner in unit 52.

For limited length data fields, a fixed time interval is initiated in unit 55 by the detection of the first character. At the end of the interval, the checksum, special character, and character count acceptability outputs are logically ANDed in unit 56. If any is unacceptable, the system is cleared for another manual scan. If all are acceptable, an audio-visual indication of success is given to the operator by unit 58, a "data ready" signal is sent through line 57 to the external data processing or other system, and the character string storage registers are enabled to transmit the data in the proper order. In lieu of the fixed delay period, a delay of the order of two hundred milliseconds is initiated or reinitiated by unit 55 upon detection of any character. A period exceeding the delay period without a character recognition occurring, constitutes the "end of data field" decision.

FIGS. 6–8 and 10–13 show one embodiment of the system of FIG. 4. Before turning to details of the construction of the various elements which in FIG. 4 are shown in block form, it will be helpful to keep in mind that the present description involves the use of an LSI integrated circuit photodiode array having a matrix of 32 × 32 photodiodes on 100 micrometer centers. Only a portion of this array will be used, namely a portion 6 cells wide and 32 cells high. The particular photodiode array that will be here described was of the type manufactured by Reticon Corporation, Mountain View, Calif., and identified as RA 32 × 32 Self Scanned Photodiode Array.

FIG. 6

Figure 6:
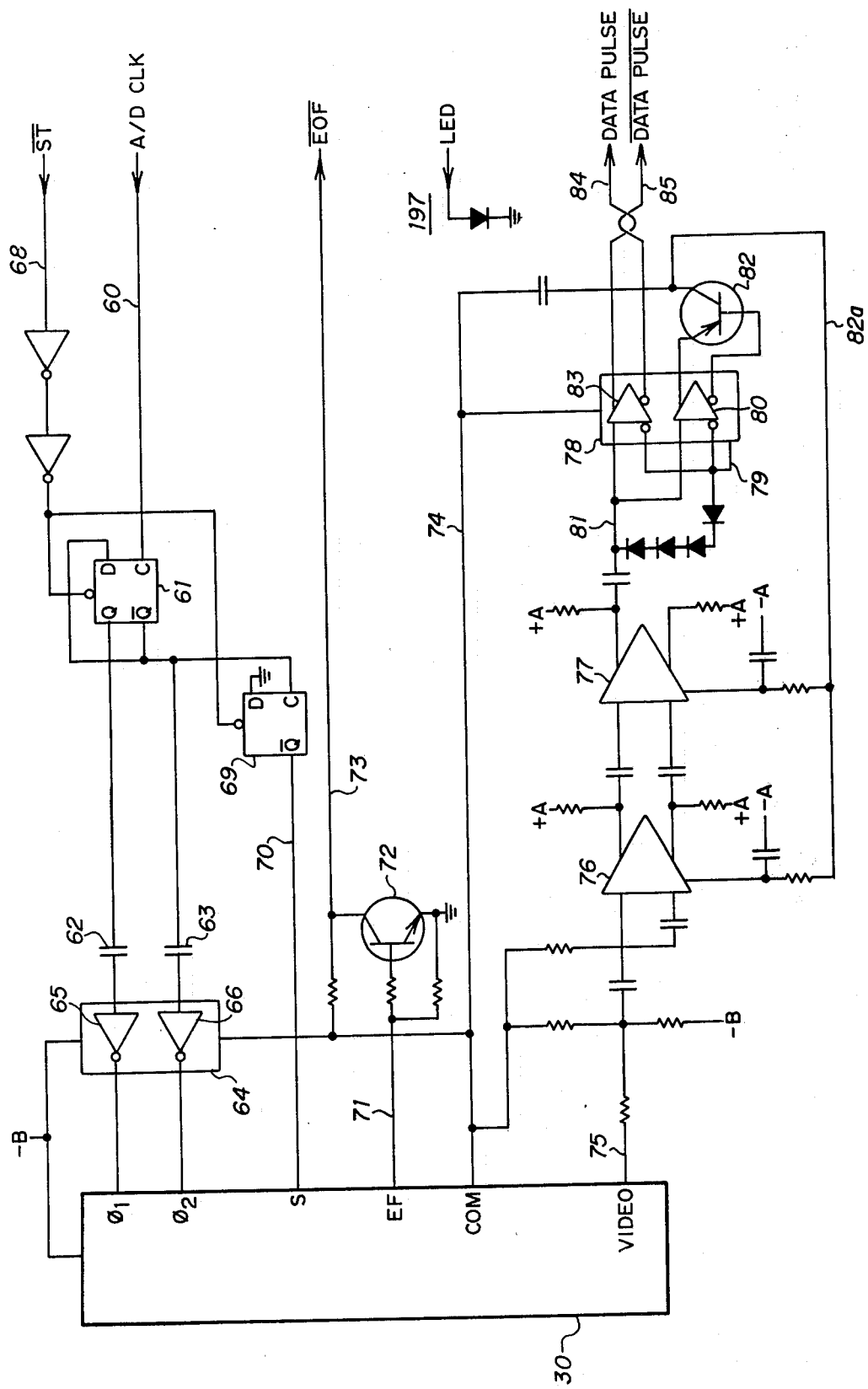
FIGS. 6, 7, 8, 10, 11, 12, and 13 are detailed circuit diagrams of a simplified version of the system of FIG. 4.

FIG. 6 includes the photodiode array 30, FIG. 2, shown in block form with the drive circuits and output amplifier-gain control provisions connected thereto. A clock line 60 leads by way of a D type flip-flop 61 to the clock input of array 30. The Q and Q outputs of flip-flop 61 are connected by way of capacitors 62 and 63 to the clock driver unit 64 which includes a pair of inverters 65 and 66 to drive array 30. Line 68 is connected to the preset terminal of flip-flop 61 as well as to preset terminal of a second flip-flop 69. The Q output of flip-flop 61 is connected to the clock input terminal of flip-flop 69. The Q output of flip-flop 69 is connected by line 70 to the start input terminal of the array 30. Line 71 leads from the array 30 by way of a transistor 72 to a line 73 to provide an end of frame sync pulse. Line 74 is the common power connection leading to array 30. Line 75 is the video signal output line. The video signal is passed by way of amplifier modules 76 and 77 to a dual comparator 78. Unit 78 is of conventional known construction providing a reference voltage on output line 79. The unit 80 in comparator 78 compares the signal voltage on line 81 with the reference voltage on line 79. If the signal voltage exceeds the reference voltage, transistor 82 with output line 82a is turned on, thereby reducing the gain in amplifiers 76 and 77.

Unit 83 compares the voltage on line 81 with the reference voltage on line 79. By this means there are produced on output lines 84 and 85 complementary voltage states which indicate the absence or presence of data pulses. A data pulse indicates that a given cell in array 30 as viewed was white or was background. Absence of the data pulse indicates that the area viewed by a given cell in array 30 was black. The gain control circuit including transistor 82 operates with the array 30 most of the time during the viewing of the white background. The transistor 82 will be just barely conducting on a white background.

The gain control circuit has a relatively long time constant, of the order of several frame periods. Thus, when a given photocell in array 30 views a black area, the threshold will not be exceeded and line 84 will be low with line 85 high. This indicates no data pulse or a black area.

FIG. 7

Figure 7:
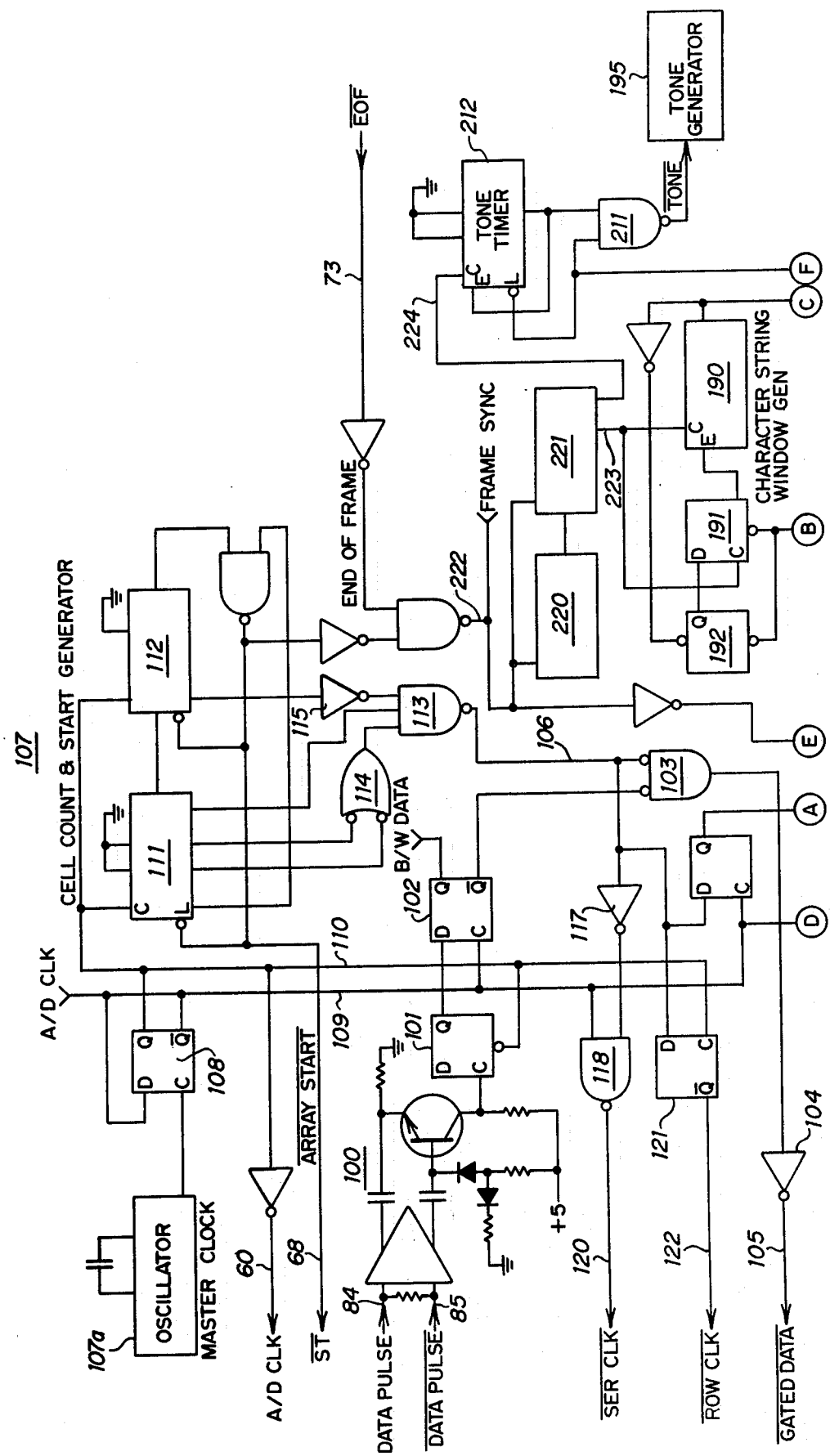

Referring now to FIG. 7, the data lines 84 and 85 are terminated in a line receiver and level shifter circuit 100. The output of the circuit 100 is applied to a D flip-flop 101 whose Q output is connected to the input of a flip-flop 102. Thus the black/white data appears on the Q and Q outputs of flip-flop 102. The Q output is connected by way of a NOR gate 103 and inverter 104 to a gated data line 105.

The second input to NOR gate 103 is supplied by line 106 from a cell count and start generator unit 107. A gate voltage on line 106 serves to enable NOR gate 103 only during the scan of the fraction of the cells of array 30, i.e., six cells wide, that are to be used in each row. The remainder of the scan period is not utilized.

This embodiment includes such gating for the sole reason that a 32 × 32 array is presently available and found to be satisfactory. As arrays of dimension 6 × 32 or the like become available, then the circuitry shown herein would be somewhat simplified, and all of the elements of the array would be used. However, in the present case the control of NOR gate 103 by way of line 106 is provided from the master clock unit 197a, which feeds flip-flop 108 to provide clock pulses on lines 109 and 110. Line 110 is connected to counters 111 and 112 which are cascaded to provide various control and timing pulses hereinafter noted. Line 106 is connected from NAND gate 113 which is fed from units 111 and 112 by way of NAND gate 114 and inverter 115, respectively.

Line 106 is connected by way of an inverter 117 to a NAND gate 118, the second input of which is supplied by way of line 109 to provide on line 120 a serial clock pulse.

Line 110 is connected by way of flip-flop 121 to a row clock line 122. The data input terminal of flip-flop 121 is connected to line 106. In this embodiment, one pulse will appear on line 122 for every six pulses appearing on line 120.

FIG. 8

Figure 8:
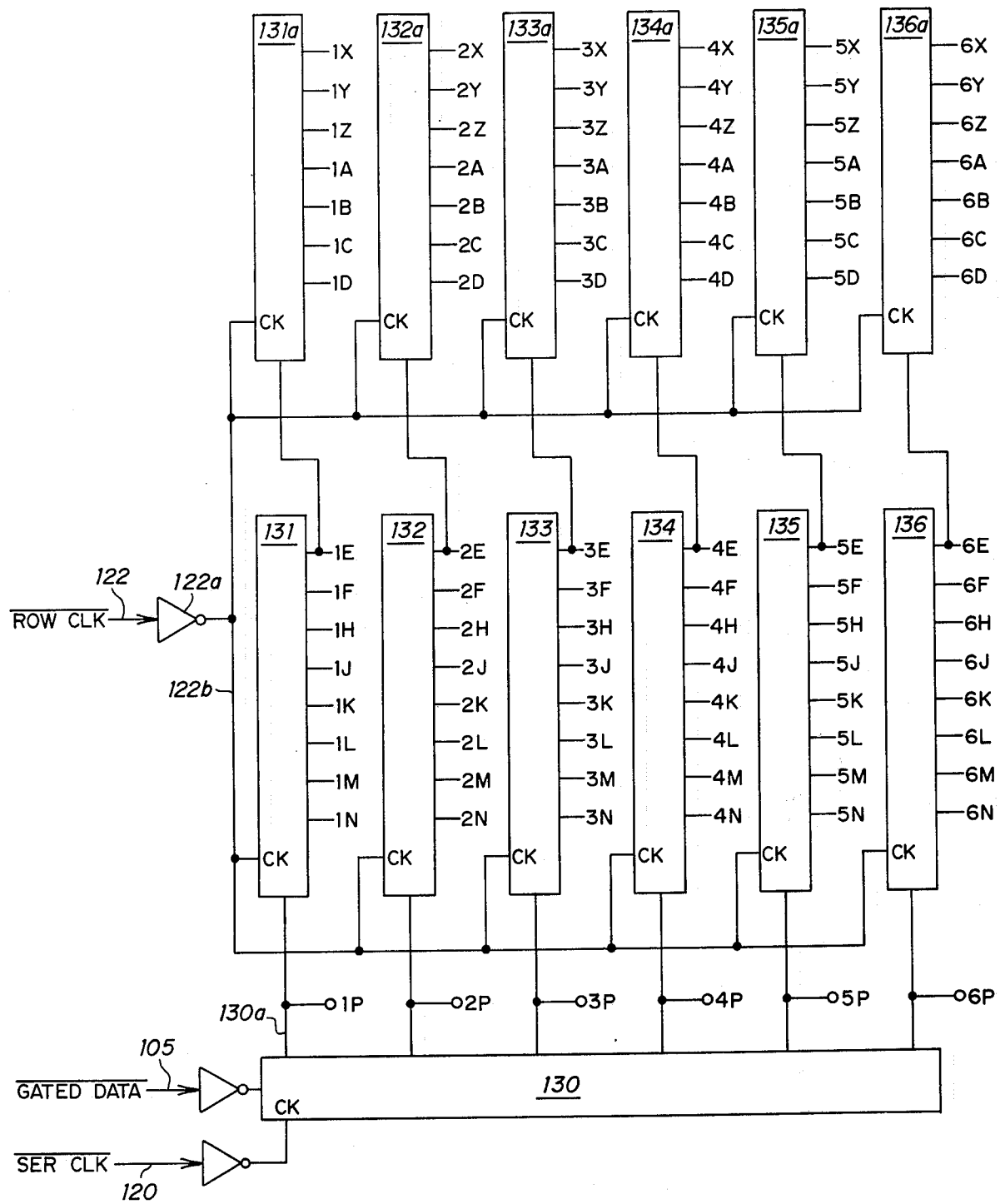

Lines 105, 120 and 122, FIG. 7, are connected to a set of shift registers illustrated in FIG. 8. In FIG. 8, line 105 is connected to the data input terminal of a six bit serial input, parallel output shift register 130. The serial clock line 120 is connected to the clock input of register 130.

The six output lines from register 130 are connected to the input lines of six serial input, parallel output shift registers 131–136. Register 131 is connected at its last output terminal 1E to the input to a similar shift register 131a. Similarly, shift registers 132–136 are connected to shift registers 132a–136a. Registers 131–136 and 131a–136a are each eight bit registers, but only a portion of the outputs are employed. The outputs are labeled, for example, 1X, 1Y, 1Z, 1A–1N for registers 131 and 131a. Similarly, registers 132 and 132a have outputs labeled 2X, 2Y, 2Z, 2A–2N. Registers 133–136 and 133a–136a are similarly labeled and are similarly employed.

With serial clock pulses appearing on line 120 and row clock pulses appearing on line 122, the data on line 105 is clocked into register 130 in synchronism with the scan of a row of photodiodes in array 30, FIG. 6. The row clock pulse line 122 is connected by way of inverter 122a and line 122b to the clock input terminal of all of the shift registers 131–136a. Thus, at the occurrence of any given row clock pulse, there may be captured in the registers 131–136a a set of binary bits which will describe the presence of a character viewed by the array 30.

The outputs 1X–6N, 1P–6P, so labeled in FIG. 8, are then applied to logic networks which combine to detect the presence of character segments in certain predetermined areas of the field viewed by the array 30, and also to detect voids between character portions of the field viewed by array 30. Binary signals representing the character segments and character voids are combined logically to provide an identification of the presence of each of the given characters that may be present in the field. Particular segments and voids that have been found to be particularly useful in permitting accurate identification of alphanumeric characters are shown in FIGS. 9a–9f.

FIGS. 9a–9f

Figure 9A:
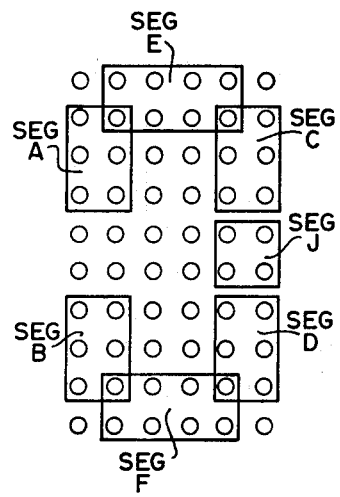
FIGS. 9a-9f illustrate various segments and voids employed in combinational logic for identification purposes.

FIG. 9a segments are labeled Seg A, Seg B, Seg C, Seg D, Seg E, Seg F and Seg J. Points corresponding to locations of cells in the 6 × 32 array employed herein are designated by coordinates wherein columns are labeled by numerals 1, 2, 3, etc., and rows by characters A, B, C, etc. Seg A, for example, includes six cells, namely cells 1B and 2B, 1C and 2C, 1D and 2D in an array of cells which is six cells wide and ten cells high. In contrast, Seg F includes cells 9B, C, D and E and 10B, C, D and E.

Figure 9B:
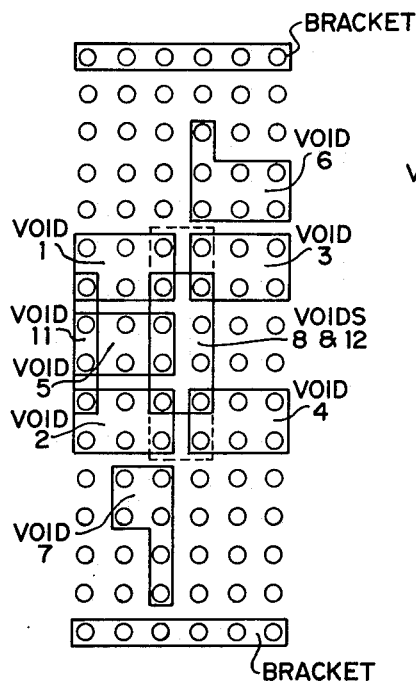

The logic employed is such that for the segment A to be indicated present, at least one cell in each of the three pairs of cells must be black. Cells 1B and 2B are ORed together as are cells 1C and 2C, and as are cells 1D and 2D. The OR outputs are then ANDed. Requirements for defining the segments of FIG. 9a will be best understood by referring to the logic diagrams later to be explained in connection with FIG. 10. However, before turning to FIG. 10, it should be noted that in addition to detecting the presence of segments as in FIG. 8a, a set of voids are detected. The voids employed are primarily illustrated by FIG. 9b, and are outlined in connection with a matrix six bits wide and sixteen bits high. The voids in FIG. 9b are characterized as voids 1–8, 11, 12, 13 and BRACKET. Voids are so connected by way of logic that in order for the circuitry to indicate the presence of a void, all of the cells within the given area must be white. An exception, however, is that void 12 allows cell pairs to be ORed for white output and the ORed outputs to be then ANDed. Both void 13 and void 8 will be indicated present if all eight cells in the central void and one or two of the two cells above the central void and one or two of the cells below the central void are white.

Figure 9C:
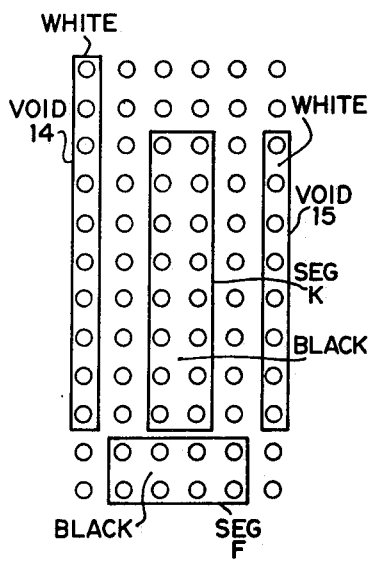

FIG. 9c illustrates Seg K and Seg F together with voids 14 and 15 employed to sense the numeral one (1).

Figure 9D:
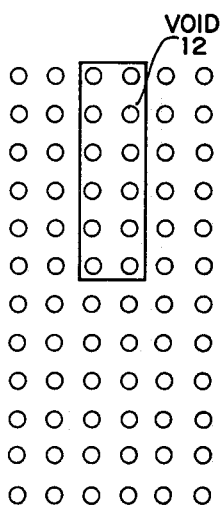

FIG. 9d illustrates void 12 employed to sense the numeral four (4).

Figure 9E:
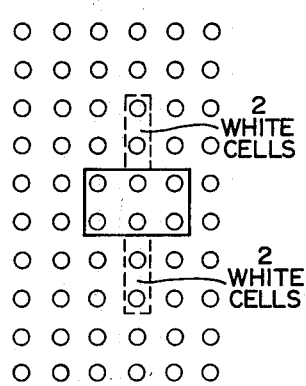
Figure 9F:
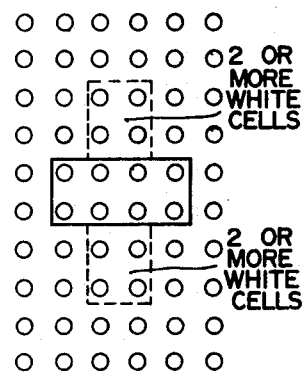

Seg H occupies a significant location in the array. Thus, the logic employed imposes further limitations before the presence of Seg H will be indicated. These limitations are in the alternative and are illustrated by FIGS. 9a and 9f. In FIG. 9e if the condition is satisfied that at least one of each of the three pairs of cells within the solid rectangle is black and two cells above and two cells below the solid rectangle as indicated in the dotted outline are all white, then a Seg H will be indicated.

In FIG. 9f if at least one of each of the four pairs of cells in the solid outline is black and if two or more of the four cells in the dotted outline above the solid black outline and two or more of the four cells in the dotted outline below the solid black outline are white, then Seg H will be indicated.

Figure 10:
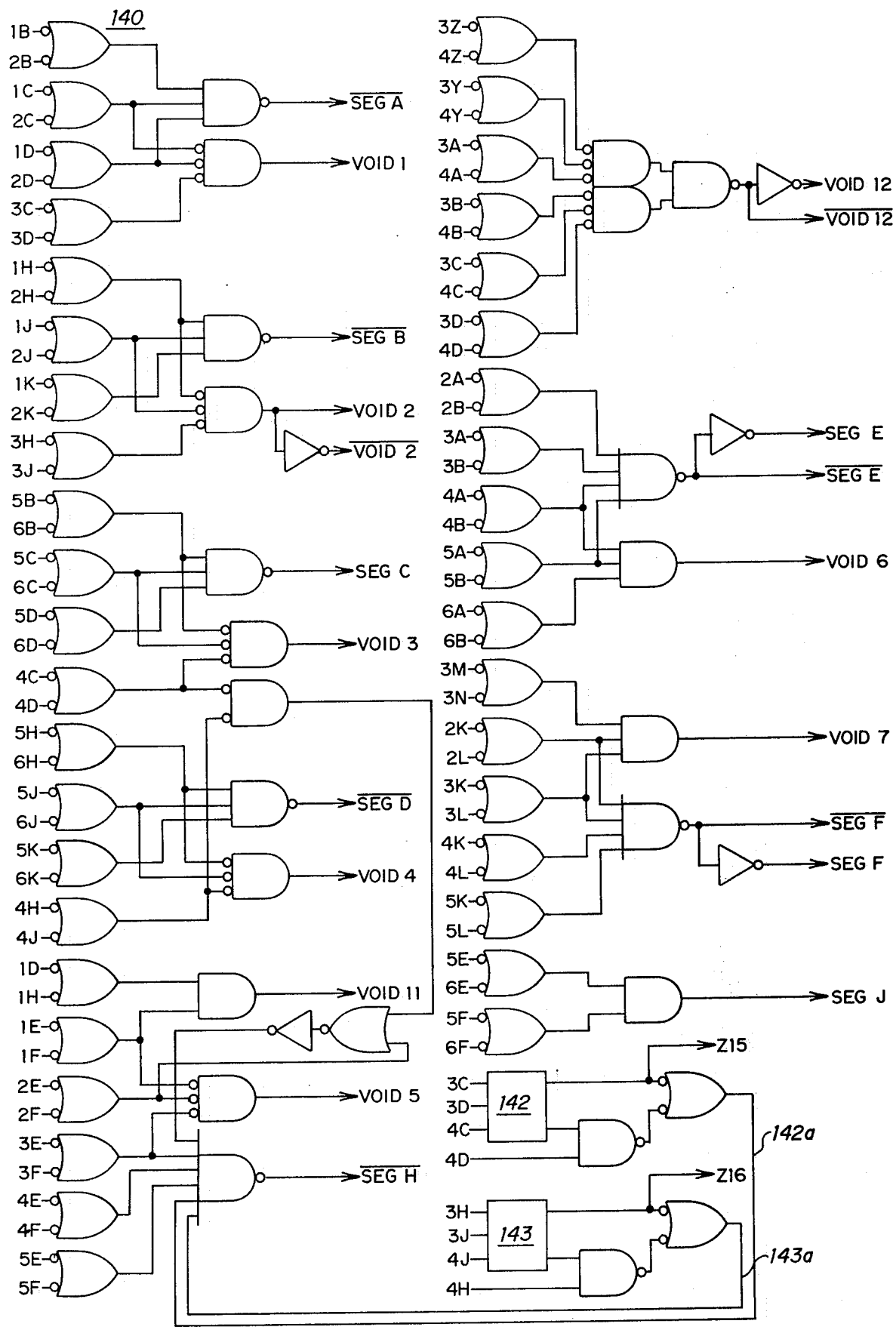
Figure 11:
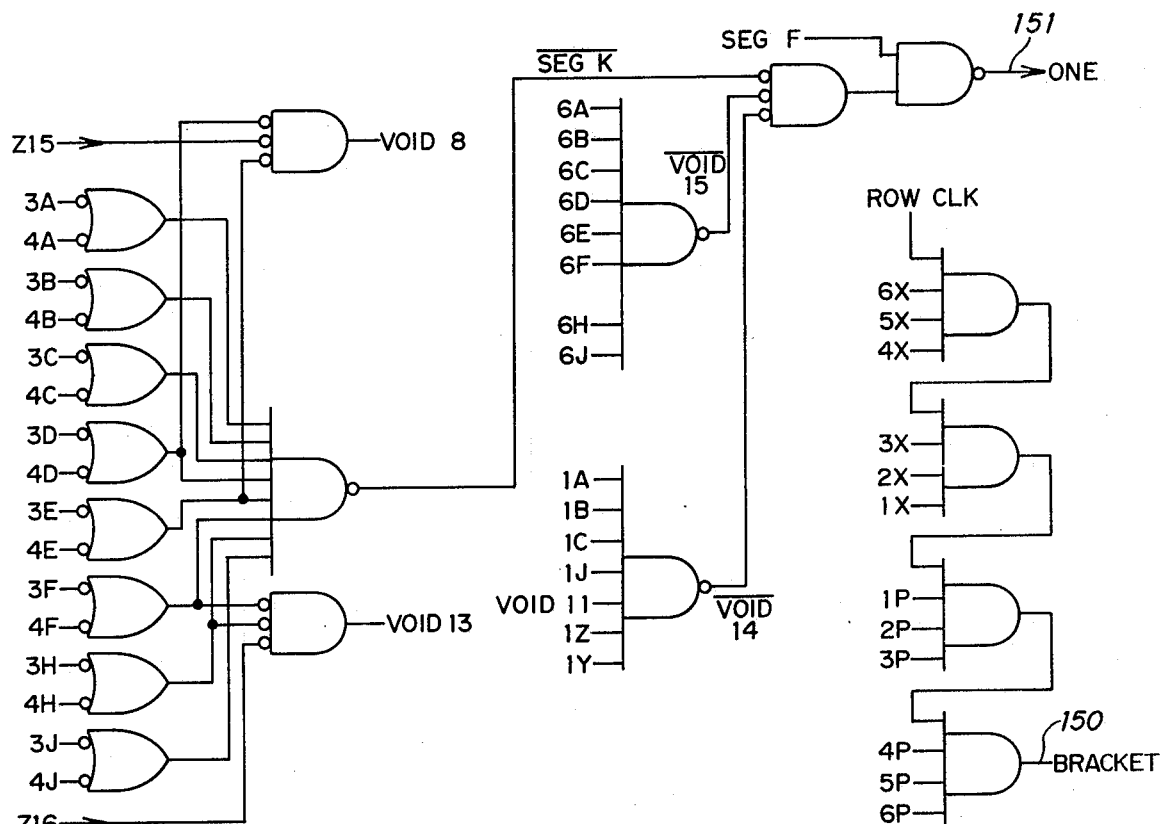
Figure 12:
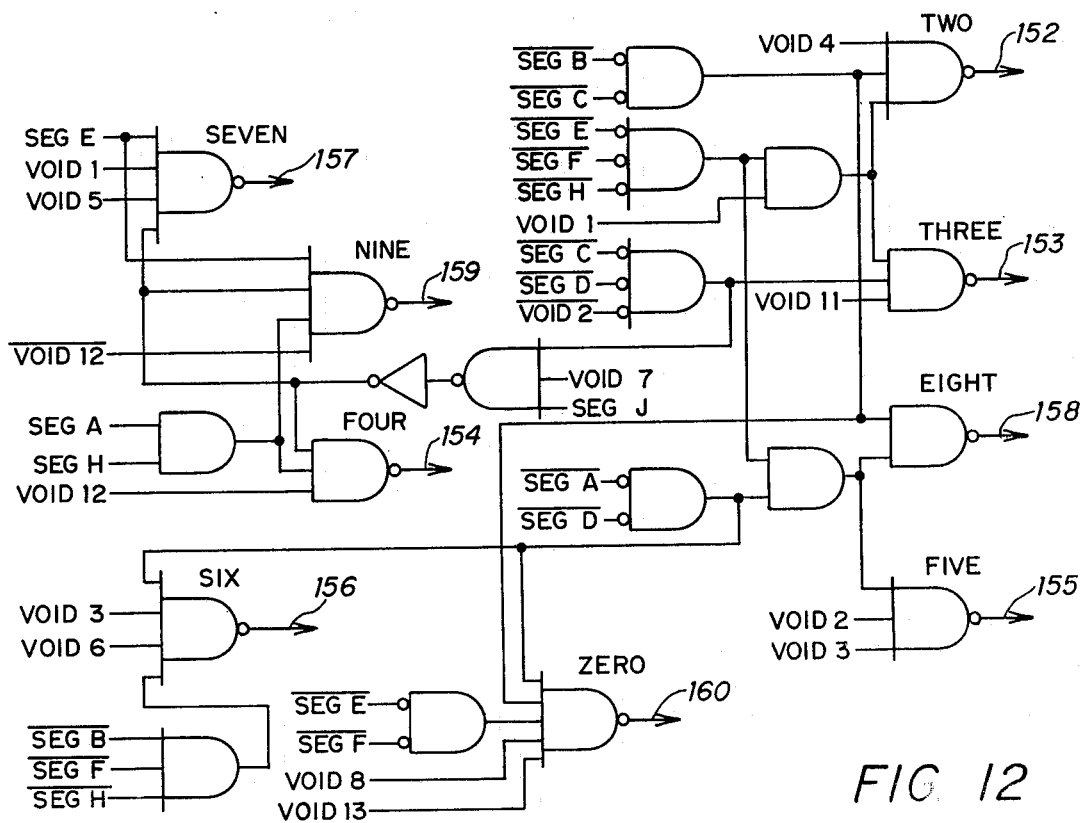

FIGS. 10 and 11

Logic for utilizing the data from FIG. 8 to carry out the logical decision for identification of the alphanumeric data represented by states in the shift registers of FIG. 8 is shown in FIGS. 10 and 11.

In FIG. 10, the input terminals to an input bank 140 of logic elements are labeled to correspond with the output lines leading from the shift registers 131–136a of FIG. 8. In the order in which they appear on FIG. 10, the presence of segments and the presence of voids will be indicated by the output lines being high or true. The absence of a segment or the absence of a void will be indicated by the output line being low or false. The logic outputs labeled in FIG. 10 are thus produced by the combinational logic illustrated through the use of symbols, the identity and meaning of which is clear, except for the fact that two added units 142 and 143 are employed in the determination of the validity of the set of FIG. 9f. There appears on the output line 142a a one state if two or more of the four cells 3C, 3D, 4C and 4D are white. Similarly, there appears on line 143a a one state if two or more of the four input lines 3H, 3J, 5J and 4H are white.

With the logic circuit connected as shown in FIGS. 10 and 11, there will be produced on output line 151, FIG. 11, a low or false state if the character represented by the states in the shift register of FIG. 8 is a one. There will be produced on line 150 a true or high state if brackets have been found to be present. The additional numerals 2–9 and O will be indicated by low states on output lines 152–160 of FIG. 12. The output lines 150–160 are then connected to the logic circuitry shown in FIG. 13.

While the foregoing description has been limited to the identification of numerals 1–9, 0 and a bracket, it will be apparent that similar logic networks can be provided for identifying uniquely the letters of the alphabet.

FIG. 13

Figure 13:
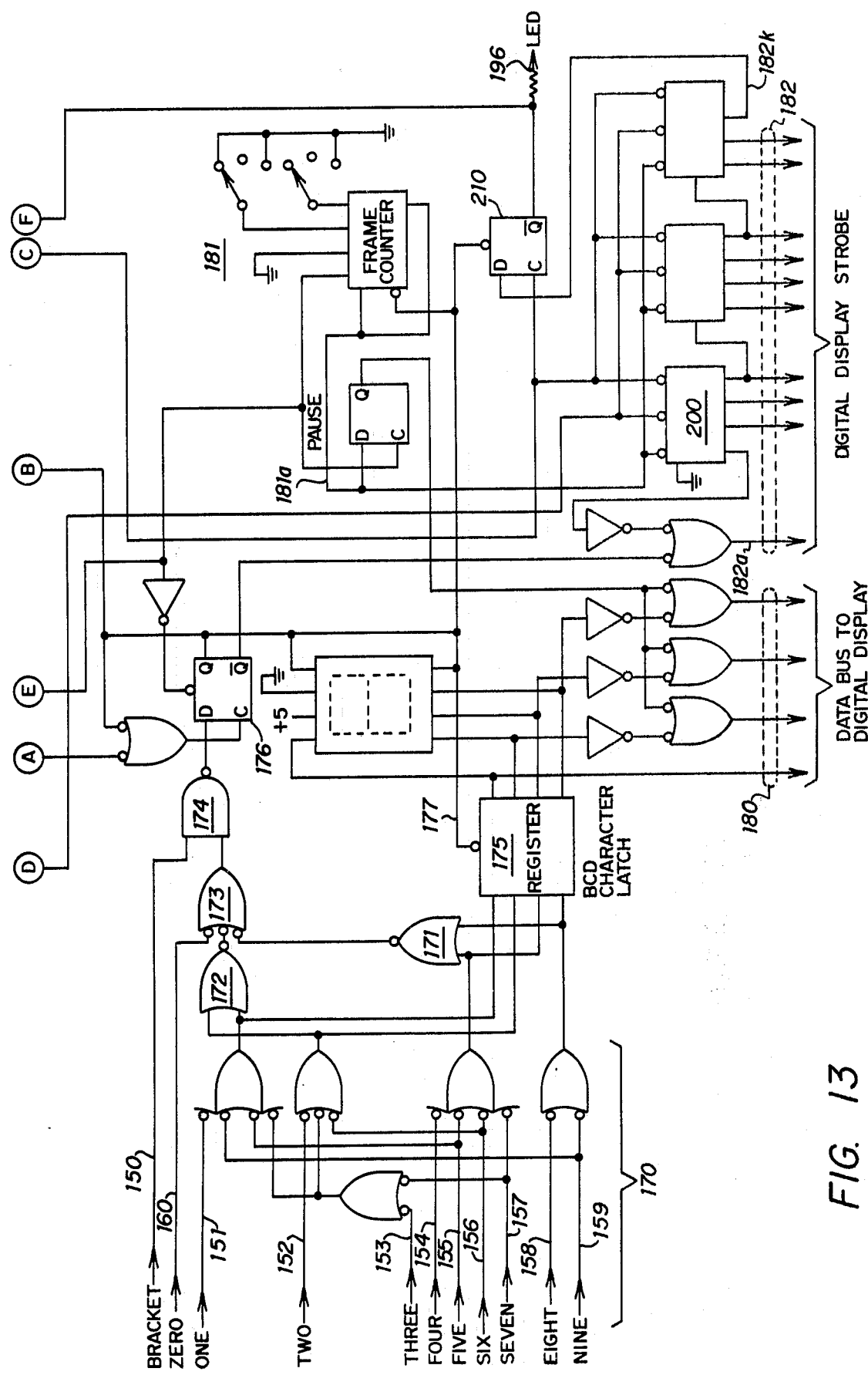

In FIG. 13, ten data lines 151–160 and a bracket line 150 denote a character and a continuous void immediately above and below the character. The character is encoded into Binary Coded Decimal (BCD) by the logic network 170. The ten data lines are ORed together by units 171–173, then ANDed in unit 174 with the "bracket" signal on line 150 to cause the BCD to latch into a register 175 via a flip-flop 176. The latch enable state on line 177 occurs after the outputs of the character recognition logic of FIGS. 10–12 have settled.

The latched BCD data is then applied by bus 180 to ten digital display devices, the number ten being assumed for purposes of this description and not as a limitation. A counter 181 counts frames which have been scanned with no character being recognized. At the end of eight consecutive such frames, the BCD data on lines 180 is strobed into one of the digital numeric display devices by a state appearing on one of lines 182.

When the first of a string of characters is recognized, a time interval of the order of six hundred milliseconds is initiated in units 190–192 of FIG. 7. At the end of this interval, if exactly 10 characters have been recognized, a short audible tone is generated by a unit 195, FIG. 7, and a line 196 is energized leading to a light emitting diode 197, FIG. 6, located on the hand-held wand to indicate a "good read" to the operator.

A second embodiment of the function provided by counters 190–192 is the initiation or re-initiation of a time interval of the order of 100 milliseconds each time a character is recognized. If the time interval lapses without reinitiation, and exactly ten characters have been recognized, the audible tone is generated and the light emitting diode is illuminated.

Lines 182, FIG. 13, lead from an eleven bit shift register 200. All of the output lines 182 initially are set at one except the first output line 182a. The shift register 200 operates in response to the output of counter 181 to shift the zero on the first output line 182 successively to each of the additional output lines through output line 182k. The counter 181 counts noncharacter frames for the purpose of generating a strobe pulse on output line 181a. This output line is then connected to the clock input of shift register 200. The counter 181 provides an output on line 181a each time the counter completes its cycle of m counts. In one embodiment the counter 181 counted eight consecutive frames without a character recognition occurring. The purpose for such operation is to be certain that the same character is not recognized more than once during a given sweep of the wand across the data field. Thus, the output of the counter 181 shifts to zero initially on line 182a and finally to the last output line 182k. Line 182k then is connected to the data input of a flip-flop 210. The Q output of flip-flop 210 is then connected to line 196 and also enables NAND gate 211 of FIG. 7, initiating a time interval by the tone timer 212. Thus, the tone generator 195 will be activted for the period determined by timer 212. Counters 220 and 221, FIG. 7, count down the clock signal on line 222 so that pulses will appear at the output lines 223 and 224 at relatively low rates, adequate for operation of tone timers 212 and of the character string window generator 190–192. For example, the input pulse rate on line 222 is of the order of 2 to 4 kilohertz. The output on line 224 is divided down by a factor of 256. The signal on line 223 is divided down by a factor of 128.

The specific embodiment in the foregoing description involves focusing a field to be read onto a two-dimensional, self-scanned photodiode array; converting the video signal to digital form; thresholding the digital data to black or white binary quantities; storing the binary quantities in a register of array width and greater than character height; analyzing the register contents to sense black segments and white voids; and uniquely combining the segments and voids for character recognition.

Certain aspects of the scanning-recognition operation described herein is described and claimed in copending application Ser. No. 462,742, filed Apr. 22, 1974 now U.S. Pat. No. 3,947,817.

Certain aspects of the recognition operation to accommodate misregistration, skew, etc. and to prevent multiple character readout is described and claimed in copending application Ser. No. 431,376, filed Jan. 7, 1974, now abandoned.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A hand operated optical data acquisition and processing system which comprises:
   a. a two-dimensional photosensitive array of width of at least five cells and of height substantially in excess of seven cells,
   b. means to focus onto said array a field past which said array moves horizontally with the widest character in said field spanning at least five cells across said array,
   c. a serial-in parallel-out shift register of width corresponding to the width of said array and having a height about 1½ times the height of a character,
   d. means to connect said register to said array for storage of binary signals representing an image,
   e. means to shift said signals through said register in direction to stimulate vertical movement of said array relative to said field at a rate which is high compared to the rate of said horizontal movement, whereby said signals may be interpreted as they move through said register, and
   f. means to attempt a character recognition with each shift of said signals through said register.

2. The combination set forth in claim 1 in which a set of said signals from said array completely passes through said register dividing the interval a character moves past said array a distance less than one resolution cell width.

3. The combination set forth in claim 2 in which said distance is less than about one-half resolution cell width.

4. The combination set forth in claim 1 wherein said array is mounted in a hand-held wand.

5. The combination set forth in claim 1 wherein means are provided in said wand to illuminate said field.

6. The combination set forth in claim 1 wherein said array is a self scanned LS1 photodiode array.

7. A method for overcoming variation in scan rate and in position of a character resulting from positional inaccuracies encountered in the use of hand-held scanning devices and/or loosely constrained document printing mechanisms and techniques, where said character is within a field of view of several character heights which comprises:
   a. sweeping a two-dimensional sensing array of several character heights horizontally along a line across a character field to provide an image output,
   b. applying the output of said array to a black/white thresholding circuit,
   c. shifting the thresholded image output of said array vertically through a recognition unit to stimulate vertical movement of said array relative to said line in one-cell-height increments at a rate such that all cells of the array are scanned in an interval required for movement of said field on said array of less than one resolution cell,
   d. attempting character recognition with each one-cell-height increment, and
   e. sensing the output of said recognition unit.

8. The method of overcoming variations in scan rate and in position of a character within a field of view of several character heights, which variations result from positional inaccuracies caused by use of a hand-held scanning device and/or loosely constrained document printing mechanisms and techniques which comprises:
  a. sweeping a two-dimensional sensing array of about one character width and several character heights horizontally along a line across a character field,
  b. applying a matrix of output signals resulting from each said character to a recognition unit,
  c. vertically shifting a set of said signals through said recognition unit at a rate such that all cells of the array are scanned in an interval required for movement of said field on said array of less than one resolution cell,
  d. attempting character recognition with each one-cell-height increment that said set is shifted, and
  e. producing a recognition output signal when a character in the shifted set is brought into registration with a set of inputs leading to said recognition unit.

9. A hand operated optical data acquisition and processing system which comprises:
  a two-dimensional photosensor array of height in cells approximately three times the array width in cells and generating binary signals representing an image,
  means to focus onto said array an image field past which said array moves with a character in the field spanning across the array,
  a first serial-in-parallel-out shift register of length in bit positions corresponding to the width in cells of said array,
  a second serial-in-parallel-out shift register of width in bit positions corresponding to the length of said first shift register and of height in excess of the height of a character in the field, said second shift register connected to the output bit positions of the first shift register, and
  means for shifting the binary signals serially into said first shift register and from the first register serially into the second shift register to simulate vertical movement of said array relative to said field at a rate in excess of the rate of movement across said field.

10. A hand operated optical data acquisition and processing system as set forth in claim 9 wherein said first shift register has X-bit positions and said second shift register comprises a plurality of 2X-bit position registers individually connected to an output of one of the bit positions of the first register.

11. A hand operated optical data acquisition and processing system as set forth in claim 9 wherein said means for shifting includes a clock generating pulses at a rate to vertically move an image through the second shift register in a time period less than the movement of the array through one cell position.

* * * * *